United States Patent [19]

Aoki et al.

[11] Patent Number: 5,010,161

[45] Date of Patent: Apr. 23, 1991

[54] POLYALDIMINE DERIVATIVES

[75] Inventors: Masaaki Aoki, Zusi; Masayuki Kamiyama; Kiyotsugu Asai, both of Yokohama; Akihiro Yamaguchi, Kamakura, all of Japan

[73] Assignee: Mitsui Toatsu Chemicals, Inc., Tokyo, Japan

[21] Appl. No.: 452,583

[22] Filed: Dec. 19, 1989

[30] Foreign Application Priority Data

Dec. 21, 1988 [JP] Japan ................... 63-320582
Dec. 21, 1988 [JP] Japan ................... 63-320584

[51] Int. Cl.$^5$ ............................................. C08G 18/10
[52] U.S. Cl. ......................................... 528/59; 128/52
[58] Field of Search ............................. 528/59, 52

[56] References Cited

U.S. PATENT DOCUMENTS

4,720,535  1/1988  Schieier et al. .................. 528/59
4,853,454  8/1989  Merger et al. .................... 528/59

Primary Examiner—John Kight, III
Assistant Examiner—D. Truong
Attorney, Agent, or Firm—Burns, Doane, Swecker & Mathis

[57] ABSTRACT

This invention relates to a novel polyaldimine, preparation process of the polyaldimine, moisture curable polyurethane composition containing the polyaldimine and use of the composition Polyaldimine of this invention is represented by the formula (I):

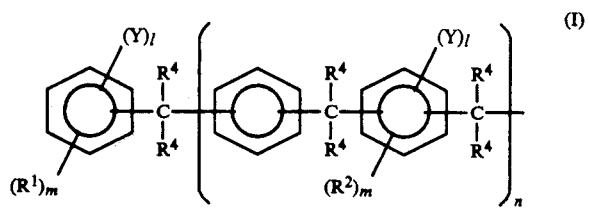

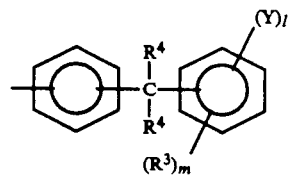

wherein $R^1$, $R^2$ and $R^3$ are a halogen atom, hydrogen atom, alkoxy group having 4 or less carbon atoms or an alkyl group having 5 or less carbon atoms, and may be the same or different; $R^4$ is a hydrogen atom or a methyl group; Y is $-N=CH-C(R^5)_3$ or $-N=CH-C(CH_3)_2-CH_2-O-CO-R^6$ wherein $R^5$ is an alkyl having 4 or less carbon atoms, $R^6$ is an alkyl group, anilino group, benzylamino group or an alkylamino group having 16 or less carbon atoms; and $l$ is an integer of 1 or 2, m is an integer of 1 to 3, and n is an integer of 0 to 300.

Polyaldimine is prepared by condensation of the corresponding aromatic polyamine and aldehyde.

A moisture curable polyurethane composition is prepared from the above polyaldimine and organic polyisocyanates. Sealing materials, wall covering materials, water proof materials and flooring materials can be prepared by blending thixotropic agents or fillers with the polyurethane composition. These materials have very good storage stability and are rapidly cured by atmospheric moisture and cured polyurethane resin having excellent properties can be obtained.

25 Claims, 2 Drawing Sheets

POLYALDIMINE DERIVATIVES

BACKGROUND OF THE INVENTION

1. Field of the Invention

The present invention relates to a novel polyaldimine derivative of a poly(phenylenebisalkylene)poly(phenylamine) which regenerates the poly(phenylenebisalkylene)poly(phenylamine) by hydrolysis, a preparation process of the polyaldimine derivative, a moisture curable polyurethane composition containing the polyaldimine derivative, and the use of the polyurethane composition.

The polyaldimine derivative which regenerates the poly(phenylenebisalkylene)poly(phenylamine) is a useful compound for a curing agent of epoxy resin and polyurethane resin.

The present invention particularly relates to a moisture curable polyurethane composition utilizing the reaction which regenerates the poly(phenylenebisalkylene)poly(phenylamine) by hydrolyzing the polyaldimine derivative and relates to the use of the polyurethane composition.

Further, the present invention relates to a moisture curable polyurethane composition which is industrially useful for the production of anticorrosive paints, floor repairing materials, water proof materials, adhesives, wall covering materials and caulking materials, and also relates to the use of the composition.

2. Description of the Prior Art

Polyurethane resin is excellent in various properties such as rubber elasticity, abrasion resistance and service life, and hence has particularly been used in recent years for anticorrosive paints, floor repairing materials, water proof materials, adhesives, wall covering materials, and caulking materials.

The method for the preparation of polyurethane resin is essentially classified into two groups, that is, one component method and two component method. In the one component method, terminal isocyanato groups of a polyurethane prepolymer cure by atmospheric moisture after application in site. In the two component method, a prepolymer which contains a principal component and a curing agent which contains polyol are mixed at the time of application in site to cause cure.

One component type polyurethane can be used by anybody because of its readiness in application method and has recently attracted much attention.

The one component type polyurethane is referred to as moisture curable polyurethane and the following compositions have conventionally been known in the art.

(1) Moisture curable polyurethane compositions by using a reaction of polyisocyanate with moisture (water), that is, a reaction wherein a part of isocyanate is converted to amine by the decarboxylation of isocyanate water adduct and resultant amine reacts with another polyisocyanate molecule to progress curing.

(2) Moisture curable polyurethane compositions composed of polyaldimine or polyketimine and polyisocyanate (British Patent 1064841 and German Patent 3607996A).

(3) Moisture curable polyurethane compositions composed of polyenamine and polyisocyanate (British Patent 1575666 and German Patent 2125247).

The compositions (1), however, have a relatively good storage stability in a sealed vessel whereas they have a markedly poor curing ability and a disadvantage of foaming. Amine or tin catalysts may be incorporated in order to improve curing ability. The additives, however, lowers storage stability of the compositions, accelerates foaming and cause problems in actual use.

In the compositions (2), polyaldimine or polyketimine reacts with polyisocyanate. Consequently, in order to cure the compositions (2) by atmospheric moisture after application in site, it is required to provide steric hindrance for polyaldimine or polyketimine, or to block isocyanato groups.

British Patent 1064841 and German Patent 3607996A have disclosed polyaldimine and polyketimine having steric hindrance. These compounds, however, exhibit slow curing rate and poor storage stability and are unsuitable for practical application.

Polyaldimine disclosed in German Patent 3607996A, in particular, is prepared from aromatic amine and is excellent in various physical properties such as mechanical strength. However, the compound has a disadvantage that the curing rate is slow and storage stability is poor at increased temperatures.

In the compositions (3), polyenamine also reacts with polyisocyanate. Consequently, when aromatic isocyanate is used as the polyisocyanate isocyanato groups must be blocked similarly to polyketimine and hence the compositions are also unsuitable for practical use.

On the other hand, it has been known that polyenamine can be applied to sealing materials in combination with polyisocyanate having relatively low activity, for example, aliphatic polyisocyanate or alicyclic polyisocyanate. The system has characteristics of non-foaming and rapid cure.

However, polyenamine reacts, though very gradually, with aliphatic or alicyclic polyisocyanate and leads to poor storage stability in a long period or in somewhat increased temperatures, even though preserved in completely sealed containers. As a result, the sealing materials containing such polyenamine have a disadvantage that initial physical properties of the sealing materials cannot be retained or viscosity is remarkably increased and leads to very poor workability. Consequently, any of the conveniently known compositions have been unsatisfactory.

The above mentioned various problems are industrially required to be overcome by providing the sealing materials with below described properties. That is, very important properties of such types of polyurethane are good storage stability in the sealed containers, excellent mechanical strengths in the initial period of application, good retention of initial physical properties during storage at increased temperatures, prevention of gelation, and good stability of viscosity. Rate of curing by atmospheric moisture must also be quick without foaming. The value of the commodity depends upon these properties.

In other words, a moisture curable polyurethane composition is strongly desired which is excellent in storage stability in the sealed containers, i.e., capable of being stored under constant viscosity for a long period, rapidly cured without foaming in the presence of moisture, and outstanding in mechanical strengths after curing.

SUMMARY OF THE INVENTION

The object of this invention is to provide a novel polyaldimine derivative of poly(phenylenebisalkylene)-poly(phenylamine), a process for preparing the polyalidimine derivative, a moisture curable polyurethane composition containing the polyaldimine derivative of poly(phenylenebisalkylene)poly(phenylamine) and the use of the composition.

The polyaldimine derivative of poly(phenylenebisalkylene) poly(phenylamine) i.e.,poly(phenylenebisalkylene)poly(phenylaldimine) is represented by the formula (I):

wherein $R^1$, $R^2$ and $R^3$ are a halogen atom, hydrogen atom, alkoxy group having 4 or less carbon atoms, or alkyl group having 5 or less carbon atoms, and may be the same or different; $R^4$ is a hydrogen atom or methyl group;
Y is $-N=CH-C(R^5)_3$ or $-N=CH-C(CH_3)_2-CH_2-O-CO-R^6$ wherein $R^5$ is an alkyl group having 4 or less carbon atoms, $R^6$ is an alkyl group having 16 or less carbon atoms, anilino group, benzylamino group, or alkylamino group having 16 or less carbon atoms; l is an integer of 1 or 2, m is an integer of 1 to 3, and n is an integer of 0 to 300.

The polyaldimine derivative of poly(phenylenebisalkylene) poly(phenylamine) i.e., poly(phenylenebisalkylene)poly(phenylaldimine) can be prepared by reacting poly(phenylenebisalkylene) poly(phenylamine) with an aldehyde.

The moisture curable polyurethane composition can be obtained by blending the above polyaldimine derivative with an organic polyisocyanate and/or a polyurethane prepolymer having terminal isocyanato groups.

A sealing material or a wall covering material can be obtained by mixing the moisture curable polyurethane composition with a thixotropic agent. A waterproof material or a flooring material can be obtained by mixing the moisture curable polyurethane composition with a filler.

The above moisture curable polyurethane composition, sealing material, wall covering material, waterproof material and flooring material have very good storage stability under conditions shielded from moisture. However, once exposed to moisture, these substances quickly solidify and form poreless polyurethane resin having excellent physical properties.

BRIEF DESCRIPTION OF THE DRAWINGS

FIG. 1 is the atlas of ALD-1 (Example 1) and FIG. 2 is that of ALD-6 (Example 6).

DETAILED DESCRIPTION OF THE INVENTION

The present inventors have carried out an intensive investigation to overcome the above problems. Consequently, they have developed a novel polyaldimine derivative which can regenerate a poly(phenylenebisalkylene)poly(phenylamine) by hydrolysis.

The polyaldimine derivative of poly(phenylenebisalkylene) poly(phenylamine) in the present invention is further used for the preparation of a moisture curable polyurethane composition to improve storage stability of the composition and to enhance mechanical strengths of cured composition. Thus the polyurethane composition can be developed for various uses.

That is, an aspect of the present invention is:

A poly(phenylenebisalkylene)poly(phenylaldimine) represented by the formula (I):

wherein $R^1$, $R^2$ and $R^3$ are a halogen atom, hydrogen atom, alkoxy group having 4 or less carbon atoms or an alkyl group having 5 or less carbon atoms, and may be the same or different; $R^4$ is a hydrogen atom or a methyl group; Y is $-N=CH-C(R^5)_3$ or $-N=CH-C(CH_3)_2-CH_2-O-CO-R^6$ wherein $R^5$ is an alkyl group having 4 or less carbon atoms, $R^6$ is an alkyl group, anilino group, benzylamino group or an alkylamino group having 16 or less carbon atoms; and l is an integer of 1 or 2, m is an integer of 1 to 3, and n is an integer of 0 to 300.

In a preferred embodiment $R^1$, $R^2$ and $R^3$ are a hydrogen atom, chlorine atom, methoxy group, ethoxy group, methyl group, ethyl group or an isopropyl group and may be the same or different; $R^4$ is a hydrogen atom or a methyl group; $R^5$ is a methyl group or a ethyl group; l is an integer of 1 to 2, m is an integer of 1 to 2, and n is an integer of 0 to 10.

In a further preferred embodiment $R^6$ is a methyl group, ethyl group, propyl group, 2-ethylpentyl group, butylamino group or an anilino group.

In a particularly preferred embodiment $R^1$, $R^2$ and $R^3$ are a hydrogen atom, chlorine atom or a methyl group; $R^4$ is a hydrogen atom; $R^5$ is a methyl group; and l is an integer of 1 to 2, m is an integer of 1 and n is an integer of 0 to 4.

In a further particularly preferred embodiment $R^6$ is a methyl group, 2-ethylpentyl group, butylamino group or an anilino group.

In another embodiment $R^1$, $R^2$ and $R^3$ are a hydrogen atom, $R^4$ is a methyl group, and l is an integer of 1, and n is an integer of 0 to 2.

In the most preferred embodiment $R^1$, $R^2$ and $R^3$ is a hydrogen atom, $R^4$ is a methyl group, l is an integer of 1, and n is zero.

One aspect of the invention relates to a process for the preparation of a poly(phenylenebisalkylene)poly(-phenylaldimine) represented by the formula (I):

(I)

wherein $R^1$, $R^2$, $R^3$, $R^4$, Y, l, m and n are the same as in the formula (I) above which comprises reacting a poly(-phenylenebisalkylene) poly(phenylamine) represented by formula (II):

(II)

wherein $R^1$, $R^2$, $R^3$, $R^4$, Y, l, m and n are the same as in formula (I) with an aldehyde represented by the formula (III) or (IV):

(III)

(IV)

In one embodiment the process is conducted such that 1 mole of the poly(phenylenebisalkylene)poly(-phenylamine) is reacted with 1 to 2 moles of the aldehyde at a temperature of 80° to 120° C. for 5 to 10 hours.

The present invention will hereinafter be illustrated in detail.

The poly(phenylenebisalkylene)poly(phenylamine) for use in preparing the polyaldimine derivative of this invention can be obtained by reacting an aromatic polyamine represented by the formula (V):

(V)

wherein R represents $R^1$, $R^2$ and $R^3$, and l and m are the same as in the above formula (I), with a phenylenebis(alkyl chloride) or a phenylenebis(alkyl alcohol) presented by the formula (VI):

(VI)

wherein $R^4$ is the same as in the above formula (I) and Q is a chlorine atom or a hydroxyl group, according to Japan Patent Kokai Tokkyo Koho 1-123828 A (89-123828) and Japan Patent Kokai Tokkyo Koho 62-155242 A (87-155242). When the condensation reaction through hydrogen chloride or water removal is carried out by using excessive amount of the aromatic polyamine, the principal product is a condensate of 1 mole of phenylenebis(alkyl halide) and 2 moles of aromatic polyamine, i.e., a condensate wherein n is zero in the above formula (II). The condensate thus obtained is purified by recrystallization or distillation under vacuum. Pure condensate obtained is used for preparing the polyaldimine deviative of this invention as in the cases of ALD-6 to ALD-9 in Table 3.

When the amount of the aromatic polyamine is decreased, a part of the above condensate further reacts with other phenylenebis (alkylhalide) or phenylenebis-(alkyl alcohol) molecules and forms polycondensate. The reaction product thus obtained is a mixture containing from 25 to 100% by mole of a compound wherein n is zero in the above formula (II), i.e., the above condensate, from 0 to 50% by mole of a polycondensate wherein n is 1, from 0 to 20% by mole of a polycondensate wherein n is 2, from 0 to 50% by mole of a polycondensate wherein n is 3, and higher polycondensates. Thus obtained condensate is a poly(phenylenebisalkylene)poly(phenylamine) consisting of the above mixture, and is used without separating its components for the preparation of the polyaldimine derivative of this invention as in the cases of ALD-1 to ALD-5 in Table 3.

Exemplary aromatic amine which is represented by the formula (V) includes, for example, aniline, o-toluidine, m-toluidine, p-toluidine, o-ethylaniline, m-ethylaniline, o-isopropylaniline, o-(n-) propylaniline, o-(tert-)butylaniline, p-(tert-)butylaniline, o-(n-)butylaniline, p-(sec-)butylaniline, 2,3-xylidine, 2,4-xylidine, 2,6-xylidine, 3,4-xylidine, 3,5-xylidine, 2-methyl-3-ethylaniline, 2-methyl-4-isopropylaniline, 2,6-diethylaniline, 2-ethyl-5-tertbutylaniline, 2,4-diisopropylaniline, 2,4,6-trimethylaniline, 4-chloroaniline, 4-bromoaniline, 4-fluoroaniline, 3-chloroaniline, 3-bromoaniline, 3,4-dichloroaniline, 3-chloro-o-toluidine, 3-chloro-p-toluidine, 2,6-dimethyl-4-chloroaniline, 3-methoxyaniline, 4-methoxyaniline, 2-isopropoxyaniline, 2,4-dimethoxyaniline, o-phenylenediamine, m-phenylenediamine, p-phenylenediamine, 2,4-diaminotoluene, 2,6-diaminotoluene, 2,4-diaminoethylbenzene, 2,6-diaminoethylbenzene, 2,4-diaminoisopropylbenzene, 2,4-diamino-tertbutylbenzene, 2,6-diamino-tert-butylbenzene, 2,6-diamino-1,3-dimethylbenzene, 1,1-dimethyl-4-aminoindan and 1,1-dimethyl-4,6-diaminoindan. Preferred compounds are aniline, toluidine derivatives and xylidine derivatives. Aniline is particularly preferred.

Phenylene-bis(alkyl halide) or phenylene-bis(alkyl alcohol) of the formula (VI) suitable for use in the process of this invention includes, for example, m-di(2-hydroxyisopropyl)benzene, p-di(2-hydroxyisopropyl)benzene, p-xylylene dichloride, and m-xylylene dichloride as indicated in Table 1. Preferred compounds are m-di(2-hydroxyisopropyl)benzene and p-xylylenedichloride.

TABLE 1

Typical example of the poly(phenylenebisalkylene) poly phenylamine) represented by the formula (II) includes poly(phenylenebismethylene)polyaniline (hereinafter indicated by the symmbol AAP-1), poly(phenylenebismethylene)poly(3-amino-4-methylaniline) (hereinafter indicated by the symbol AAP-2), poly(phenylenebismethylene)poly(4-chloroaniline) (hereinafter indicated by the symbol AAP-3), and 4,4'-[1,3-phenylenebis(1methylethylidene)] bisaniline (hereinafter indicated by the symbol AAP-4).

Above typical examples are indicated in Table 2.

The aldimine derivative of poly(phenylenebisalkylene) poly(phenylamine),i.e.,poly(phenylenebisalkylene)poly(phenylaldimine) represented by the formula (I) (hereinafter indicated by the symbol ALD) can be obtained by reacting the poly(phenylenebisalkylene) poly(phenylamine) represented by the above formula (II) with an aldhehyde represented by the formula (III) or (IV):

$$O=CH-C(R^5)_3 \quad \text{(III)}$$

$$O=CH-C(CH_3)_2-CH_2-O-CO-R^6 \quad \text{(IV)}$$

Exemplary aldehyde suitable for use in the process of this invention include, for example, trimethylacetaldehyde, triethylacetaldehyde, tripropylacetaldehyde, an equimolar adduct of 3-hydroxy-2,2-dimethylpropanal and phenyl isocyanate, an equimolar adduct of 3-hydroxy-2,2-dimethyl propanal and butyl isocyanate or benzyl isocyanate, an equimolar condensate of 3-hydroxy-2,2-dimethylpropanal and 2-ethylhexanoic acid, and an equimolar condensate of 3-hydroxy-2,2-dimethylpropanal and acetic acid, propionic acid or butyric acid.

Poly(phenylenebisalkylene)poly(phenylaldimine) represented by the above formula (I) can be prepared by conducting a dehydrating reaction of poly(phenylenebisalkylene)poly(phenylamine) of the formula (II) with aldehyde of the above formula (III) or (IV) under azeotropic distillation of water in the presence of an acid catalyst and toluene or xylene as a solvent. The reaction is carried out at 80° to 120° C. in toluene or 120° to 160° C. in xylene, and continued until distillation of water into a water separator is ceased.

The proportion of the above aldehyde to the above poly(phenylenebisalkylene)poly(phenylamine) is from 1 to 2 equivalents of the aldehyde per equivalent of the poly (phenylenebisalkylene)poly(phenylamine).

The condensed product poly(phenylenebisalkylene) poly(phenylaldimine) represented by the formula (I) is generally a composition of two or more compounds.

The present invention also includes poly(phenylenebisalkylene) poly(phenylaldimine) having unreacted amino groups which is represented by the formula (VII):

wherein $R^1$, $R^2$, $R^3$, $R^4$, Y, l, m and n are the same as in the above formula (I), and x, y and z are an integer of 0 to 2, $1>x$, $1>y$, $1>z$ and $x+Y+z>0$.

Further, a mixture of the compounds represented by the formula (I) and the formula (VII) is also included in the scope of the present invention.

Suitable combinations in this invention for preparing poly(phenylenebisalkylene)poly(phenylaldimine) (ALD) by the condensation of poly(phenylenebisalkylene)poly(phenylamine) (AAP) and aldehyde are illustrated in Table 3.

TABLE 2

Poly(phenylenebisalkylene)poly(phenylamine)

| No. | Structure | MW | SP (°C.) | Composition n=0 | n=1 | n=2 | n=3 | n=4 | m | l |
|---|---|---|---|---|---|---|---|---|---|---|
| AAP-1 | [structure: aniline-CH₂-phenyl-CH₂ repeat] | 960 | 68 | 28 mol % | 16.8 | 10.5 | 7.8 | 36.9 | 1 | 1 |
| AAP-2 | [structure: methyl-diaminobenzene-CH₂-phenyl-CH₂] | 550 | 46 | 44.7 mol % | 29.7 | 14.6 | n≧3 11.2 | — | 1 | 2 |
| AAP-3 | [structure: chloro-aniline-CH₂-phenyl-CH₂] | 1150 | 78 | — | — | — | — | — | 1 | 1 |
| APP-4* | [structure: H₂N-phenyl-C(CH₃)₂-phenyl-C(CH₃)₂-phenyl-NH₂] | 344 | MP 112° C. | 100 mol % | — | — | — | — | 1 | 1 |

*Product of Mitsui Petrochemical Industries Ltd. BISANILINE-M ®
MW: Molecular weight
MP: Melting point
SP: Softening point

TABLE 3

Synthesis of Poly(phenylenebisalkylene)poly(phenylaldimine)

| Example No. | poly (ph. ald.) | Poly(phenylamine) Structure | g (mol) | Aldehyde Compound | g (mol) |
|---|---|---|---|---|---|
| 1 | ALD-1 | [aniline-CH₂-phenyl-CH₂ repeat] | 116 (0.671) | CH₃-C(CH₃)(CH₃)-CHO | 79 (0.872) |
| 2 | ALD-2 | [methyl-diaminobenzene-CH₂-phenyl-CH₂] | 56 (0.671) | C₂H₅-C(C₂H₅)(C₂H₅)-HCO | 112 (0.872) |
| 3 | ALD-3 | [chloro-aniline-CH₂-phenyl-CH₂] | 133 (0.671) | CH₃-C(CH₃)(CH₃)-CHO | 79 (0.872) |
| 4 | ALD-4 | [aniline-CH₂-phenyl-CH₂ repeat] | 116 (0.671) | phenyl-NHCOOCH₂-C(CH₃)(CH₃)-CHO | 163 (0.738) |

TABLE 3-continued

Synthesis of Poly(phenylenebisalkylene)poly(phenylaldimine)

| Example No. | | Diamine structure | Diamine MW (Eq) | Aldehyde structure | Aldehyde MW (Eq) |
|---|---|---|---|---|---|
| 5 | ALD-5 | H₂N–[C₆H₄–CH₂–C₆H₄–CH₂]ₙ | 116 (0.671) | CH₃(CH₂)₂–CH(C₂H₅)–CO–CH₂–C(CH₃)₂–CHO | 179 (0.738) |
| 6 | ALD-6 | H₂N–C₆H₄–C(CH₃)₂–C₆H₄–C(CH₃)₂–C₆H₄–NH₂ | 172 (1.0) | (CH₃)₃C–CHO | 108 (1.25) |
| 7 | ALD-7 | H₂N–C₆H₄–C(CH₃)₂–C₆H₄–C(CH₃)₂–C₆H₄–NH₂ | 172 (1.0) | (C₂H₅)₃C–HCO | 160 (1.25) |
| 8 | ALD-8 | H₂N–C₆H₄–C(CH₃)₂–C₆H₄–C(CH₃)₂–C₆H₄–NH₂ | 172 (1.0) | C₆H₅–NHCOOCH₂–C(CH₃)₂–CHO | 243 (1.1) |
| 9 | ALD-9 | H₂N–C₆H₄–C(CH₃)₂–C₆H₄–C(CH₃)₂–C₆H₄–NH₂ | 172 (1.0) | CH₃(CH₂)₂–CH(C₂H₅)–CO–CH₂–C(CH₃)₂–CHO | 266 (1.17) |

Poly(phenylaldimine)

| Example No. | poly (ph. ald.) | Structure | Amine-Eq. (Eq/100 g) | MW | App. |
|---|---|---|---|---|---|
| 1 | ALD-1 | [–C₆H₃(N=CH–C(CH₃)₃)–CH₂–C₆H₄–CH₂–]ₙ | 0.439 | 1400 | B.S. |
| 2 | ALD-2 | CH₃–C₆H₂(N=CH–C(C₂H₅)₃)₂–[CH₂–C₆H₄–CH₂–]ₙ | 0.585 | 1300 | D.B.S. |
| 3 | ALD-3 | [–C₆H₂(Cl)(N=CH–C(CH₃)₃)–CH₂–C₆H₄–CH₂–]ₙ | 0.413 | 1600 | B.S. |
| 4 | ALD-4 | N=CH–C(CH₃)₂–CH₂OCONH–C₆H₅; [–C₆H₃–CH₂–C₆H₄–CH₂–]ₙ | 0.245 | 2000 | R.B S. |

TABLE 3-continued
Synthesis of Poly(phenylenebisalkylene)poly(phenylaldimine)

| # | Comp. | Structure | Amine-Eq. | MW | App. |
|---|---|---|---|---|---|
| 5 | ALD-5 | (structure with N=CH-C(CH3)-CH2OCC(OC2H5)-(CH2)3CH3 group attached to poly(phenylenebismethylene)) | 0.244 | 2200 | B.S. |
| 6 | ALD-6 | CH3-C(CH3)(CH3)-C(H)=N-Ph-C(CH3)(CH3)-Ph-C(CH3)(CH3)-Ph-N=C(H)-C(CH3)(CH3)-CH3 | 0.417 | 480 | B.S. |
| 7 | ALD-7 | C2H5-C(C2H5)(C2H5)-C(H)=N-Ph-C(CH3)(CH3)-Ph-C(CH3)(CH3)-Ph-N=C(H)-C(C2H5)(C2H5)-C2H5 | 0.355 | 570 | B.S. |
| 8 | ALD-8 | Ph-N(H)COCH2-C(CH3)(CH3)-C(H)=N-Ph-C(CH3)(CH3)-Ph-C(CH3)(CH3)-Ph- ... -N=C(H)-C(CH3)(CH3)-CH2OC(O)N(H)-Ph | 0.241 | 830 | B.S. |
| 9 | ALD-9 | CH3(CH2)3CH(C2H5)COCH2-C(CH3)(CH3)-C(H)=N-Ph-C(CH3)(CH3)-Ph-C(CH3)(CH3)-Ph- ... -N=C(H)-C(CH3)(CH3)-CH2OCC(OC2H5)(CH2)3CH3 | 0.228 | 880 | B.S. |

Note:
Poly(ph. ald) Poly(phenylaldimine)
Cata. Catalyst
Comp. Name of Compound
Amine-Eq. Amine Equivalent
(Eq/100 g) (Equivalent/100 g)
MW Molecular Weight
App. Appearance
F.A. Formic acid
B. Brown
D.B. Dark brown
R.B. Reddish brown
S. Solid ALD-1 is a poly(phenylenebismethylene)poly(-phenylaldimine) obtained by condensation of a poly(-phenylenebismethylene) poly(phenylamine) AAP-1 illustrated in Table 2 with trimethylacetaldehyde in the presence of a formic acid catalyst.

ALD-2 is a poly(phenylenebismethylene)poly(methylphenylaldimine) obtained by condensation of poly(-phenylenebismethylene)poly (3-amino-4-methylaniline) AAp-2 with triethylacetaldehyde in the presence of a formic acid catalyst.

ALD-3 is a poly(phenylenebismethylene)poly (4-chlorophenylaldimine) obtained by condensation of poly (phenylenebismethylene)poly(4-chloroaniline) AAP-3 with trimethylacetaldehyde in the presence of a formic acid catalyst.

ALD-4 is a poly(phenylenebismethylene)poly(-phenylaldimine) obtained by condensation of poly(-phenylamine) AAP-1 with an aldehyde which is an equimolar adduct of 3-hydroxy-2,2-dimethylpropanal and phenyl isocyanate, in the presence of a formic acid catalyst.

ALD-5 is a poly(phenylenebismethylene)poly(-phenyledimine) obtained by condensation of poly(-phenylenebismethylene) poly(phenylamine) AAP-1 with an aldehyde which is an equimolar condensation product of 3-hydroxy-2,2'-dimethoxypropanal and 2-ethylhexanoic acid in the presence of a formic acid catalyst.

ALD-6 is a polyaldimine derivative obtained by condensation of 4,4'- [1,3-phenylenebis(1-methylethylidene)] bisaniline with trimethylacetaldehyde in the presence of a formic acid catalyst.

ALD-7 is a polyaldimine derivative obtained by condensation of 4,4'-[1,3-phenylenebis(1-methylethylidene)] bisaniline with triethylacetaldehyde in the presence of a formic acid catalyst.

ALD-8 is a polyaldimine derivative obtained by condensation of 4,4'-[1,3-phenylenebis(1-methylethylidene)] bisaniline with an aldehyde which is an equimolar adduct of 3-hydroxy-2,2-dimethylpropanal and phenyl isocyanate in the presence of a formic acid catalyst.

ALD-9 is a polyaldimine derivative obtained by condensation of 4,4'-[1,3-phenylenebis(1-methylethylidene)] bisaniline with an aldehyde which is an equimolar condensate of 3-hydroxy-2,2-dimethylpropanal and 2-ethylhexanoic acid in the presence of a formic acid catalyst.

Exemplary polyisocyanate suitable for use in the preparation of the moisture curable polyurethane composition of this invention includes aromatic, aliphatic or alicyclic polyisocyanates, for example:

(1) diisocyanates such as tolylene diisocyanate including various mixtures of isomers, diphenylmethane diisocyanate including various mixtures of isomers, 3,3'-dimethyl-4,4'-biphenylene diisocyanate, 1,4-phenylene diisocyanate, xylylene diisocyanate, tetramethylxylylene diisocyanate, naphthylene diisocyanate, isophorone diisocyanate, hexamethylene diisocyanate, hydrogenated xylylene diisocyanate, 1,4 cyclohexyl diisocyanate, 1-methyl-2,4-diisocyanatocyclohexane and 2,4,4-trimethyl-1,6-diiso cyanatocyclohexane, (2) triisocyanates such as 4,4',4"-triphenylmethane triisocyanate and tris(4-phenylisocyanate) thiophosphate, and (3) polyfunctional isocyanates such as urethane modified polyisocyanate, isocyanurate modified polyisocyanate, carbodiimide modified polyisocyanate, biuret modified polyisocyanate, crude tolylene diisocyanate and polymethylene polyphenylpolyisocyanate.

A prepolymer having terminal isocyanato groups which is used for the process of this invention can be obtained by reacting one or more of the above polyisocyanates with a known active hydrogen containing compound such as polyol and polyamine which have two or more active hydrogen atoms in a molecule so that free isocyanato groups remain in the resulting prepolymer.

The prepolymer is prepared by reacting the organic polyisocyanate with the active hydrogen containing compound at 100° C. for several hours. The preferred isocyanato group content of the prepolymer is from 0.5 to 20.0 % by weight.

The term two or more active hydrogen atoms means two or more hydroxyl groups, one or more amino groups, two or more mercapto groups, a combination of a hydroxyl group and an amino group, or a combination of a hydroxyl group and a mercapto group.

An exemplary active hydrogen containing compound is a polyetherpolyol obtained by addition polymerization of alkylene oxide such as propylene oxide, ethylene oxide or a mixture thereof to water; poly-hydroxy alcohols such as ethylene glycol, propylene glycol, glycerol, trimethylolpropane, pentaerythritol, sorbitol and sucrose; aromatic amines such as aniline, tolylenediamine and p,p'-diamino-diphenylmethane; aliphatic amines and alkanol amines such as ethylenediamine, ethanolamine and diethanolamine; and a mixture of these compounds.

Other active hydrogen containing compounds which can be used include polyetherpolyamines obtained by converting hydroxyl groups of the above polyetherpolyol to amino groups, polytetramethyleneether polyols, polycarbonate polyols, polycaprolactone polyols, polyesterpolyols such as polyethylene adipate, polybutadiene polyols, higher fatty acid esters such as castor oil, polymer polyols obtained by grafting a vinyl monomer on the above polyether or polyester polyols, unsaturated polyols obtained by addition polymerization of an ethylenically unsaturated compound having one or more active hydrogen atoms in a molecule, and mercapto group containing ethers.

The moisture curable polyurethane composition of this invention contains the above poly(phenylenebisalkylene)poly(phenylaldimine) of this invention and the organic polyisocyanate and/or the prepolymer having terminal isocyanato groups, in a proportion that the amount of amino group regenerated by hydrolysis of the poly (phenylenebisalkylene)poly(phenylaldimine) is from 0.7 to 1.5 moles per mole of the isocyanato group of the organic polyisocyanate and/or the prepolymer having terminal isocyanato groups.

The moisture curable polyurethane composition of this invention is used, for example, for caulking material of vehicles, sealing material, wall covering material, water-proof material, flooring material, coating and adhesive.

The moisture curable polyurethane composition of this invention is used by mixing with below described additives such as a thixotropic agent, filler, plasticizer, solvent, adhesion improver, colorant and a stabilizer in order to control viscosity, physical properties and service life of the composition depending upon the application.

The sealing material and the wall covering material of this invention can be obtained by adding the thixotropic agent to the above moisture curable polyurethane composition containing the poly(phenylenebisalkylene)poly(phenylaldimine) and the organic polyisocyanate and/or the polyurethane prepolymer having terminal isocyanato groups.

The water-proof material and the flooring material of this invention can be obtained by adding the filler to the above moisture curable polyurethane composition containing the poly (phenylenebisalkylene)poly(phenylaldimine) and the organic polyisocyanate and/or the polyurethane prepolymer having terminal isocyanato groups.

Exemplary thixotropic agents suitable for use in this invention include, for example, colloidal silica, fatty acid amide wax, aluminum stearate, surface treated bentonite, polyethylene short fiber and phenol resin short fiber. The thixotropic agent is used in an amount of generally from 0.2 to 15 % by weight, preferably from 0.5 to 10 % by weight and more preferably from 0.5 to 8 % by weight per weight of the moisture curable polyurethane composition.

Representative examples of the filler which can be used include, for example, calcium carbonate, talc, kaolin, aluminum sulfate, zeolite, diatomaceous earth, polyvinyl chloride paste resin, glass balloon and polyvinylidene chloride resin balloon. The filler is used in the range of generally 60 % by weight or less, preferably from 20 to 60% by weight and more preferably from 25 to 50% by weight per weight of the moisture curable polyurethane composition.

Exemplary plasticizer which can be used in this invention includes, for example, dioctyl phthalate, dibutyl phthalate, dilauryl phthalate, butylbenzyl phthalate, dioctyl phthalate, diisodecyl adipate and trioctyl phosphate. These plasticizers are used in the range of 50% by weight or less, preferably from 5 to 40% by weight and more preferably from 8 to 30% by weight per weight of the moisture curable polyurethane composition.

Suitable solvents which can be used in this invention include, for example, aromatic hydrocarbons such as toluene and xylene, aliphatic hydrocarbons such as hexane, heptane and octane, petroleum base solvents from gasoline fraction to kerosene fraction, esters such as ethyl acetate and butyl acetate, ketones such as acetone, methyl ethyl ketone and methyl isobutyl ketone, and ether esters such as ethoxyethyl acetate and butoxyethyl acetate. The solvent is used in an amount of 50% by weight or less, preferably 40% by weight or less and more preferably from 5 to 30% by weight per weight of the moisture polyurethane composition.

Silane coupling agents are used for the adhesion improver of this invention. Carbon black and titanium white are used as a colorant. Hindered phenol compounds and triazol compounds are used as a stabilizer.

In the practice of the present invention, the filler, plasticizer, thixotropic agent and other necessary additives are blended in a mixer such as a planetary mixer or a dissolver. Then the organic polyisocyanate and/or the prepolymer having terminal isocyanato groups and the poly(phenylenebisalkylene) poly(phenylaldimine) are added to the mixer and thoroughly mixed.

When the additives have high moisture content, these additives must previously be dehydrated or addition of a dehydrating agent such as zeolite is required.

The moisture curable polyurethane composition thus obtained is packed in a sealed container in a nitrogen atmosphere and stored.

The moisture curable polyurethane composition containing the novel poly(phenylenebisalkylene)polY(phenylaldimine) of this invention, the organic polyisocyanate and/or the prepolymer having terminal isocyanato groups has very good storage stability in the sealed container under conditions isolated from atmospheric moisture. The composition has high retention of physical properties and good stability of viscosity even though stored at increased temperatures. On the other hand, when the container is once unsealed, the composition of this invention is rapidly cured by exposing to the atmospheric moisture. Poreless solid polyurethane resin having excellent mechanical strengths can thus be obtained, which property is quite different from conventional moisture curable polyurethane.

EXAMPLE

The poly(phenylenebisalkylene)poly(phenylaldimine), the preparation process thereof, the moisture curable polyurethane composition using the poly(phenylenebisalkylene)poly(phenylaldimine) and the use of the composition will hereinafter be illustrated further in detail by way of examples and comparative examples.

EXAMPLE 1

To a reaction vessel equipped with a stirrer, thermometer, dropping funnel and a water separator, 116 g (0.671 equivalent) of poly(phenylenebismethylene)poly(phenylamine) (AAP-1), 0.2 cc of formic acid and 116 g of toluene were charged and mixed at room temperature in a nitrogen atmosphere. After 10 minutes, 79 g (0.872 equivalent) of trimethylacetaldehyde was added dropwise over 30 minutes from the dropping funnel. The internal temperature was raised from 23° C. to 35° C. The external temperature was set at 110° C. and the internal temperature was raised to 109° C. over 40 minutes. After 30 minutes, distilled water was started to separate in the water separator. Successively, the external temperature was set at 120° C. and the reaction was continued for 6 hours. When the reaction was finished, the internal temperature was 118° C. and the distilled water was 12.5 g.

Then the reaction mixture was transferred to an evaporator and the external temperature was set at 85° C. The internal pressure was reduced to 9 mmHg with a vacuum pump, and toluene and unreacted trimethylacetaldehyde was distilled off for 2 hours.

Poly(phenylenebismethylene)poly [phenyl(trimethylmethyl) aldimine](ALD-1) obtained was 153 g.

Figure 1:
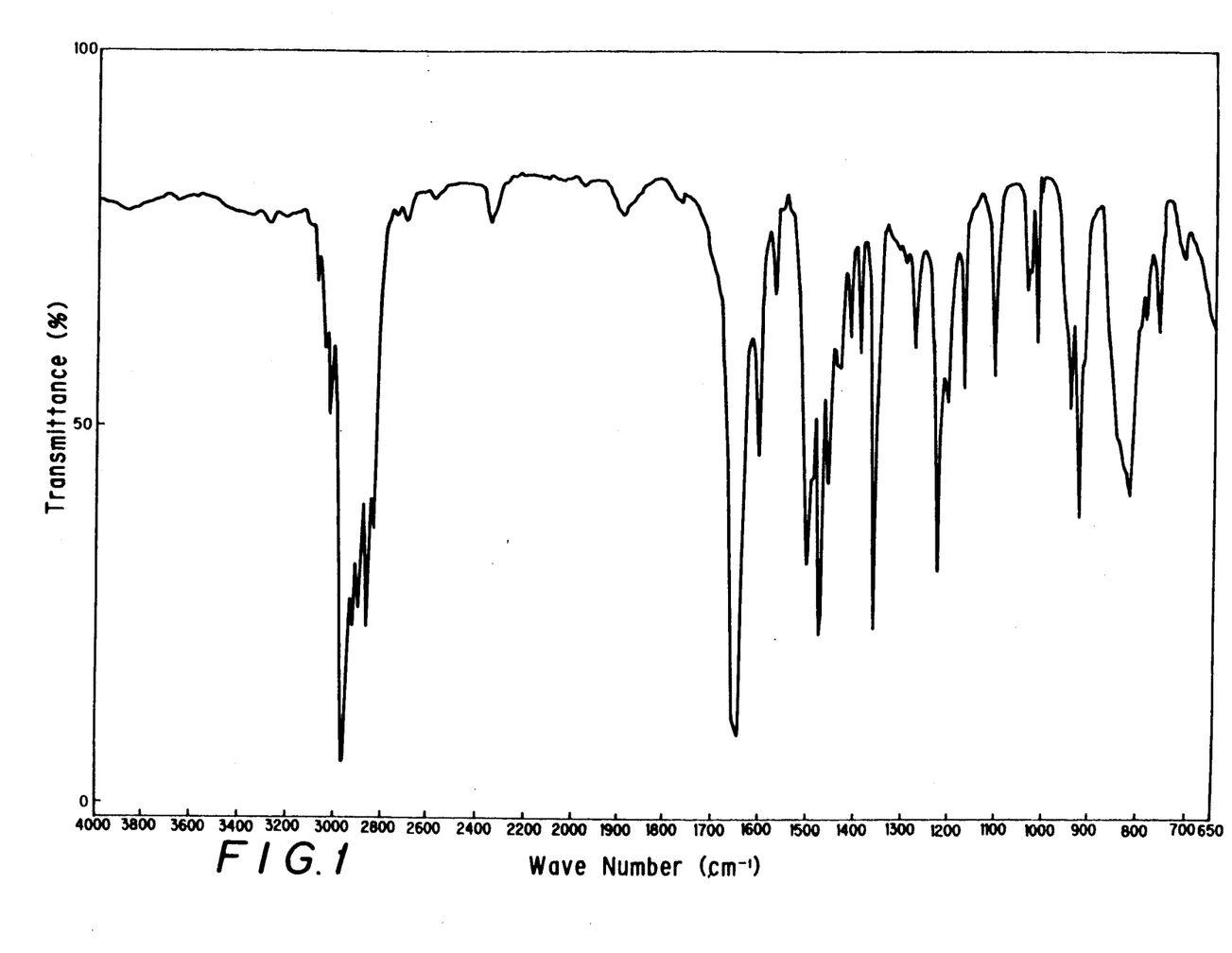
FIGS. 1 and 2 are IR absorption spectrum atlases of the polyaldimine derivatives.

The IR spectrum of the reaction product ALD-1 had a characteristic absorption of —N=CH— at 1650 cm$^{-1}$ as illustrated in FIG. 1. Poly(phenylenebismethylene)poly [phenyl(trimethylmethyl) aldimine] was a brown solid at room temperature and had an amine equivalent of 0.439 equivalent/(100 g) by a perchloric acid/glacial acetic acid method.

EXAMPLE 2

To a reaction vessel equipped with a stirrer, thermometer, dropping funnel and a water separator, 56 g (0.671 equivalent) of poly(phenylenebismethylene)poly(3-amino-4-methylaniline) (AAP-2), 0.2 cc of formic acid and 56 g of toluene were charged and mixed at room temperature in a nitrogen atmosphere. After 10 minutes, 112 g (0.872 equivalent) of triethylacetaldehyde was added dropwise over 30 minutes from the dropping funnel. The internal temperature was raised from 23° C. to 45° C. The external temperature was set at 110° C. and the internal temperature was raised to 109° C. over 340 minutes. After 30 minutes, distilled water was started to separate in the water separator. Successively, the external temperature was set at 122° C. and the reaction was continued for 8 hours. When the reaction was finished, the internal temperature was 120° C. and the distilled water was 11.0 g.

Then the reaction mixture was transferred to an evaporator and the external temperature was set at 95° C. The internal pressure was reduced to 4 mmHg with a vacuum pump, and toluene and unreacted triethylacetaldehyde was distilled off for 3 hours.

Poly(phenylenebismethylene)poly [tolyl(triethylmethyl)aldimine] (ALD-2) thus obtained was 115 g.

The IR spectrum of the reaction product ALD-2 had a characteristics absorption of —N=CH— at 1650 cm$^{-1}$. Poly(phenylenebismethylene)poly [tolyl(triethylmethyl)aldimine] was a dark brown solid at room temperature and had an amine equivalent of 0.585 equivalent/(100 g) by a perchloric acid/glacial acetic acid method.

EXAMPLE 3

To a reaction vessel equipped with a stirrer, thermometer, dropping funnel and a water separator, 133 9 (0.671 equivalent) of poly(phenylenebismethylene)poly(4-chloroaniline) (AAP-3), 0.2 cc of formic acid and 133 g of toluene were charged and such mixed at room temperature in a nitrogen atmosphere. After 10 minutes, 79 g (0.872 equivalent) of trimethylacetaldehyde was added dropwise over 30 minutes from the dropping funnel. The internal temperature was raised from 23° C. to 45° C. The external temperature was set at 110° C. and the internal temperature was raised to 109° C. over 40 minutes. After 30 minutes, distilled water was started to separate in the water separator. Successively, the external temperature was set at 122° C. and the reaction was continued for 8 hours. When the reaction was finished, the internal temperature was 120° C. and the distilled water was 11.7 g.

Then the reaction mixture was transferred to an evaporator and the external temperature was set at 85° C. The internal pressure was reduced to 6 mmHg with a vacuum pump, and toluene and unreacted trimethylacetaldehyde was distilled off for 3 hours.

Poly(phenylenebismethylene)poly [4-chlorophenyl (trimethylmethyl)aldimine] (ALD-3) thus obtained was 153 g.

The IR spectrum of the reaction product ALD-3 had a characteristic absorption of —N=CH— at 1650 cm$^{-1}$. Poly(phenylenebismethylene)poly [4-chlorophenyl(trimethylmethyl) aldimine] was a brown solid at room temperature and had an amine equivalent of 0.413 equivalent/(100 g) by a perchloric acid/glacial acetic acid method.

EXAMPLE 4

To a reaction vessel equipped with a stirrer, thermometer, dropping funnel and a water separator, 116 g (0.671 equivalent) of poly(phenylenebismethylene)polyphenylamine (AAP-1), 0.2 cc of formic acid and 116 g of toluene were charged and mixed at room temperature in a nitrogen atmosphere. After 10 minutes, 163 g (0.738 equivalent) of an equimolar adduct of 3-hydroxy-2,2-dimethyl propanal and phenyl isocyanate was added dropwise over 30 minutes from the dropping funnel. The internal temperature was raised from 23° C. to 35° C. The external temperature was set at 110° C. and the internal temperature was raised to 109° C. over 30 minutes. After 30 minutes, distilled water was started to separate in the water separator. Successively, the external temperature was set at 122° C. and the reaction was continued for 8 hours. When the reaction was finished, the internal temperature was 120° C. and the distilled water was 11.2 g.

Then the reaction mixture was transferred to an evaporator and the external temperature was set at 95° C. The internal pressure was reduced to 4 mmHg with a vacuum pump, and toluene was distilled off for 2 hours.

Poly(phenylenebismethylene) poly [phenyl {dimethyl (phenylaminocarboxymethyl)methyl} aldimine] (ALD-4) thus obtained was 275 g.

EXAMPLE 5

To a reaction vessel equipped with a stirrer, thermometer, dropping funnel and a water separator, 116 g (0.671 equivalent) of poly(phenylenebismethylene)polyphenylamine (AAP-1), 0.2 cc of formic acid and 116 g of toluene were charged and mixed at room temperature in a nitrogen atmosphere.

After 10 minutes, 179 g (0.785 equivalent) of an aldehyde obtained by equimolar condensation of 3-hydroxy-2,2-dimethylpropanal and 2-ethylhexanoic acid was added dropwise over 30 minutes from the dropping funnel. The internal temperature was raised from 23° C. to 40° C. The external temperature was set at 110° C. and the internal temperature was raised to 109° C. over 40 minutes. After 30 minutes, distilled water was started to separate in the water separator. Successively, the external temperature was set at 122° C. and the reaction was continued for 8 hours. When the reaction was finished, the internal temperature was 120° C. and the distilled water was 11.9 g.

Then the reaction mixture was transferred to an evaporator and the external temperature was set at 85° C. The internal pressure was reduced to 6 mmHg with a vacuum pump, and toluene was distilled off for 2 hours.

The polyaldimine ALD-5 thus obtained was 288 g.

The IR spectrum of the reaction product ALD-5 had a characteristic absorption of —N=CH— at 1650 cm$^{-1}$. The polyaldimine ALD-5 was a brown solid at room temperature and had an amine equivalent of 0.237 equivalent/(100 g) by a perchloric acid/glacial acetic acid method.

(Example of moisture curable polyurethane composition)

EXAMPLE 6

To a reaction vessel equipped with a stirrer, thermometer, dropping funnel and a water separator, 172 g (1.0 equivalent) of 4,4'-[1,3-phenylenebis(1-methylethylidene)] bisaniline, 0.2 cc of formic acid and 172 g of toluene were charged and mixed at room temperature in a nitrogen atmosphere.

After 10 minutes, 108 g (1.25 equivalent) of trimethylacetaldehyde was added dropwise over 30 minutes from the dropping funnel. The internal temperature was raised from 23° C. to 35° C. The external temperature was set at 110° C. and the internal temperature was raised to 109° C. over 40 minutes. After 30 minutes, distilled water was started to separate in the water separator. Successively, the external temperature was set at 120° C. and the reaction was continued for 6 hours. When the reaction was finished, the internal temperature was 118° C. and the distilled water was 18.5 g.

Then the reaction mixture was transferred to an evaporator and the external temperature was set at 85° C. The internal pressure was reduced to 8 mmHg with a vacuum pump, and toluene and unreacted trimethylacetaldehyde were distilled off for 2 hours.

4,4'- [1,3-Phenylenebis(1-methylethylidene)] bis [phenyl(trimethylmethyl)aldimine] (ALD-6) thus obtained was 245 g.

Figure 2:
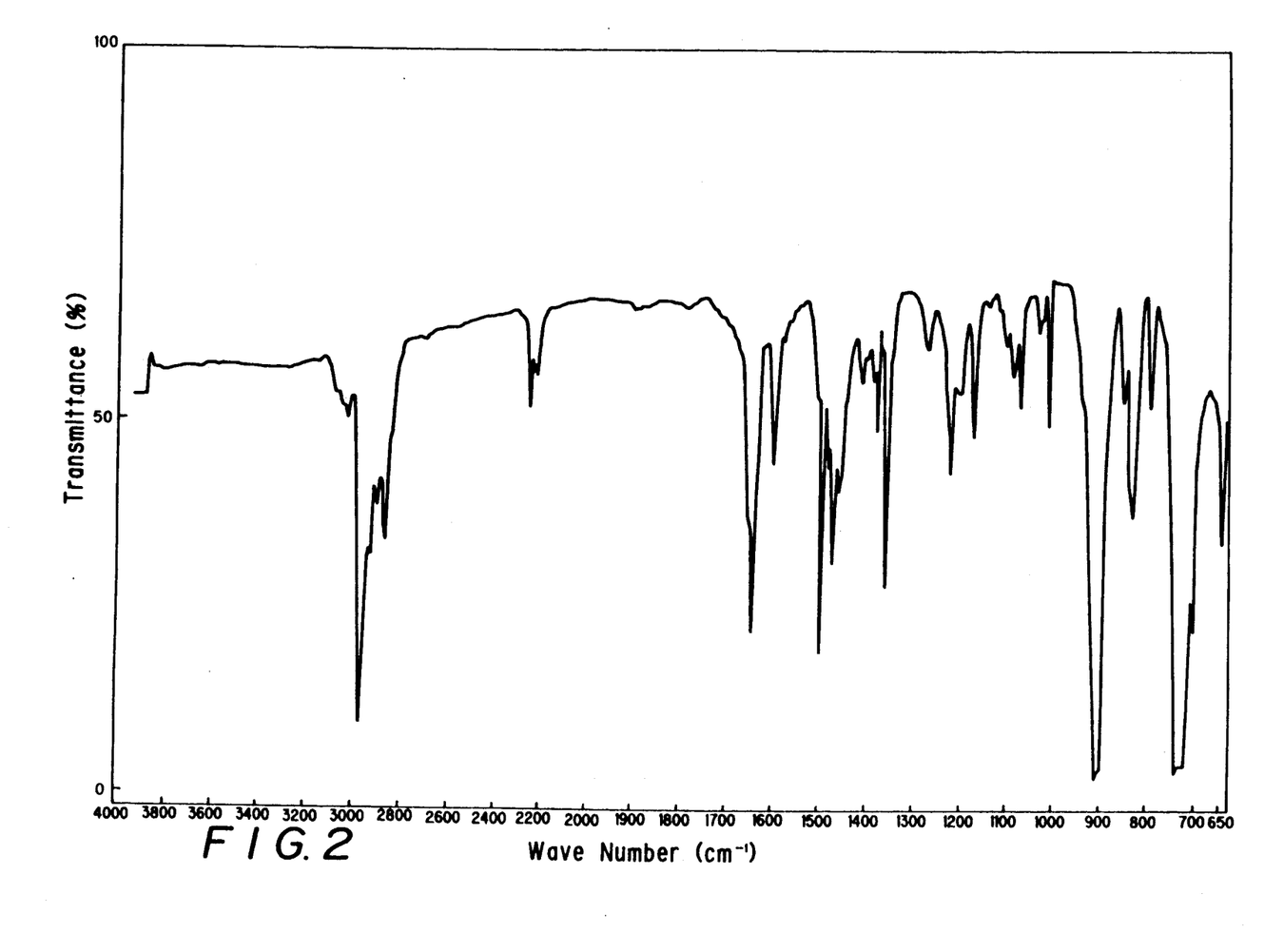

The IR spectrum of the reaction product ALD-6 had a characteristic absorption of —N=CH— at 1650 cm$^{-1}$ as illustrated in FIG. 2.

4,4'- [1,3-Phenylenebis(1-methylethylidene)] bis [phenyl(trimethylmethyl)aldimine ] was a brown solid at room temperature and had an amine equivalent of 0.417 equivalent/(100 g) by a perchloric acid/glacial acetic acid method.

In the next step, a polyurethane prepolymer having terminal isocyanato groups (HIPRENE ® L-167, NCO=6.35 %, a product of Mitsui Toatsu Chemicals Inc.) obtained by reacting tolylene diisocyanate with polyoxytetramethylene glycol was used as polyisocyanate.

A moisture curable polyurethane composition was prepared by mixing 377 g (0.942 equivalent) of a 60 % toluene solution of the above ALD-6, 693 g (1.047 equivalent) of the polyurethane prepolymer, and 2 g of 2-ethylhexanoic acid in a nitrogen atmosphere.

Physical properties of the polyurethane composition were tested, and evaluation results on curing ability, storage stability and mechanical strengths are illustrated in Table 4.

The cured polyurethane composition of ALD-6 exhibited comparable strengths to those of conventional two component type heat-curing polyurethane elastomer such as L-167/methylenebisorthochloroaniline (MOCA) system. Further, the polyurethane composition of ALD-6 was excellent in workability due to one component system and had a characteristic of non-foaming.

Tack-free time was measured in accordance with JIS-A5758 (1986) paragraph 6, item 10.

Curing time was measured by the following method. The sample of polyurethane composition was spread on a glass plate in the form of a sheet with a thickness of 3 mm and allowed to stand at 23° C. relative humidity. The sample was released from the glass plate every 10 hours and observed whether the sheet had been cured to the bottom surface or not.

Storage stability was evaluated by storing the moisture curable polyurethane composition for a prescribed period under sealed conditions and then measuring viscosity change with a B-type viscometer.

Mechanical strengths of the cured polyurethane composition after application in site were evaluated by measuring 100 % and 200 % tensile modulus, tensile strength and elongation at break of the specimen after standing at 23° C. for 7 days in 50 % relative humidity and further standing at 50° C. for 7 days in accordance with JIS K-6301.

EXAMPLE 7

To a reaction vessel equipped with a stirrer, thermometer, dropping funnel and a water separator, 172 g (1.0 equivalent) of 4,4'-[1,3-phenylenebis(1-methylethylidene)] bisaniline, 0.2 cc of formic acid and 172 g of toluene were charged and mixed at room temperature in a nitrogen atmosphere.

After 10 minutes, 160 g (1.25 equivalent) of triethylacetaldehyde was added dropwise over 30 minutes from the dropping funnel. The internal temperature was raised from 23° C. to 35° C. The external temperature was set at 110° C. and the internal temperature was raised to 109° C. over 40 minutes. After 30 minutes, distilled water was started to separate in the water separator. Successively, the external temperature was set at 120° C. and the reaction was continued for 6 hours. When the reaction was finished, the internal temperature was 118° C. and the distilled water was 17.5 g.

Then the reaction mixture was transferred to an evaporator and the external temperature was set at 85° C. The internal pressure was reduced to 9 mmHg with a vacuum pump, and toluene and unreacted triethylacetaldehyde were distilled off for 2 hours.

4,4'-[1,3-Phenylenebis(1-methylethylidene)] bis [phenyl(triethylmethyl)aldimine] (ALD-7) thus obtained was 236 g.

The IR spectrum of the reaction product ALD-7 had a characteristic absorption of —N=CH— at 1650 cm$^{-1}$.

4,4'-[1,3-Phenylenebis(1-methylethylidene)] bis [phenyl(triethylmethyl)aldimine] was a brown solid at room temperature and had an amine equivalent of 0.355 equivalent/(100 g) by a perchloric acid/glacial acetic acid method.

In the next step, a polyurethane prepolymer having terminal isocyanato groups (HIPRENE® L-167, NCO=6.35 %, a product of Mitsui Toatsu Chemicals Inc.) obtained by reacting tolylene diisocyate with polyoxytetramethylene glycol was used as polyisocyanate.

A moisture curable polyurethane composition was prepared by mixing 376 g (0.80 equivalent) of a 60 % toluene solution of the above ALD-7, 583 g (0.88 equivalent) of the polyurethane prepolymer, and 4 g of 2-ethylhexanoic acid in a nitrogen atmosphere.

Physical properties of the polyurethane composition were tested, and evaluation results on curing ability, storage stability and mechanical strengths are illustrated in Table 4.

The cured polyurethane composition of ALD-7 exhibited comparable strengths to those of conventional two component type heat-curing polyurethane elastomer such as L-167/methylene bisorthochloroaniline(-MOCA) system. Further, the ALD-7 composition was excellent in workability due to one component system and had a characteristic of non-foaming.

EXAMPLE 8

To a reaction vessel equipped with a stirrer, thermometer, dropping funnel and a water separator, 172 g (1.0 equivalent) of 4,4'-[1,3-phenylehebis(1-methylethylidene)] bisaniline, 0.2 cc of formic acid and 172 g of toluene were charged and mixed at room temperature in a nitrogen atmosphere.

After 10 minutes 243 g (1.1 equivalent) of an aldehyde obtained by equimolar addition of 3-hydroxy-2,2-dimethylpropanal and phenyl isocyanate was added dropwise over 30 minutes from the dropping funnel. The internal temperature was raised from 23° C. to 35° C. The external temperature was set at 110° C. and the internal temperature was raised to 109° C. over 40 minutes. After 30 minutes, distilled water was started to separate in the water separator. Successively, the external temperature was set at 120° C. and the reaction was continued for 6 hours. When the reaction was finished, the internal temperature was 118° C. and the distilled water was 17.0 g.

Then the reaction mixture was transferred to an evaporator and the external temperature was set at 85° C. The internal pressure was reduced to 9 mmHg with a vacuum pump, and toluene was distilled off for 2 hours. 4,4'- [1,3-Phenylenebis(1-methylethylidene)] bis [phenyl {dimethyl(phenylaminocarboxymethyl)methyl} aldimine] (ALD-8) thus obtained was 410 g.

The IR spectrum of the reaction product ALD-8 had a characteristic absorption of —N=CH—at 1650 cm$^{-1}$.

4,4'- [1,3-Phenylenebis(1-methylethylidene)] bis [phenyl }dimethyl(phenylaminocarboxymethyl)methyl} aldimine] was a brown solid at room temperature and had an amine equivalent of 0.241 equivalent/(100 g) by a perchloric acid/glacial acetic acid method.

In the next step, a polyurethane prepolymer having terminal isocyanato groups (HIPRENE® L-167, NCO=6.35 %, a product of Mitsui Toatsu Chemicals Inc.) obtained by reacting tolylene diisocyate with polyoxytetramethylene glycol was used as polyisocyanate.

A moisture curable polyurethane composition was prepared by mixing 409 g (0.591 equivalent) of a 60 % toluene solution of the above ALD-8, 430 g (0.650 equivalent) of the polyurethane prepolymer, and 3 g of 2-ethylhexanoic acid in a nitrogen atmosphere.

Physical properties of the polyurethane composition were tested, and evaluation results on curing ability, storage stability and mechanical strengths are illustrated in Table 4.

The cured polyurethane composition of ALD-8 exhibited comparable strengths to those of conventional two component type heat-curing polyurethane elastomer such as L-167/methylene bisorthochloroaniline(-MOCA) system. Further, the ALD-8 composition was excellent in workability due to one component system and had a characteristic of non-foaming.

EXAMPLE 9

To a reaction vessel equipped with a stirrer, thermometer, dropping funnel and a water separator 172 g (1.0 equivalent) of 4,4'-[1,3-phenylenebis(1-methylethylidene)] bisaniline, 0.2 cc of formic acid and 172 g of toluene were charged and mixed at room temperature in a nitrogen atmosphere.

After 10 minutes 266 g (1.17 equivalent) of an aldehyde obtained by equimolar condensation of 3-hydroxy-2,2-dimethylpropanal and 2-ethylhexanoic acid was added dropwise over 30 minutes from the dropping funnel. The internal temperature was raised from 23° C. to 35° C. The external temperature was set at 110° C. and the internal temperature was raised to 109° C. over 40 minutes. After 30 minutes, distilled water was started to separate in the water separator. Successively, the external temperature was set at 120° C. and the reaction was continued for 6 hours. When the reaction was finished, the internal temperature was 118° C. and the distilled water was 12.5 g.

Then the reaction mixture was transferred to an evaporator and the external temperature was set at 85° C. The internal pressure was reduced to 8 mmHg with a vacuum pump, and toluene was distilled off for 2 hours. 4,4'- [1,3-Phenylenebis(1-methylethylidene)] bis [phenyl {dimethyl(2-ethylhexanoyloxy)methyl} aldimine] (ALD-9) thus obtained was 420 g.

The IR spectrum of the reaction product ALD-9 had a characteristic absorption of —N=CH— at 1650 cm$^{-1}$.

4,4'- [1,3-Phenylenebis(1-methylethylidene)] bis [phenyl {dimethyl(2-ethylhexanoyloxy)methyl} aldimine] was a brown solid at room temperature and had an amine equivalent of 0.228 equivalent/(100 g) by a perchloric acid/glacial acetic acid method.

In the next step, a polyurethane prepolymer having terminal isocyanato groups (Hiprene® L-167, NCO=6.35 %, a product of Mitsui Toatsu Chemicals Inc.) obtained by reacting tolylene diisocyate with polyoxytetramethylene glycol was used as polyisocyanate.

A moisture curable polyurethane composition was prepared by mixing 406 g (0.556 equivalent) of a 60 % toluene solution of the above ALD-9, 405 g (0.611 equivalent) of the polyurethane prepolymer, and 3 g of 2-ethylhexanoic acid in a nitrogen atmosphere.

Physical properties of the polyurethane composition were tested, and evaluation results on curing ability, storage stability and mechanical strengths are illustrated in Table 4.

The cured polyurethane composition of ALD-9 exhibited comparable strengths to those of conventional two component type heat-curing polyurethane elastomer such as L-167/methylene bisorthochloroaniline(-MOCA) system. Further, the ALD-9 composition was excellent in workability due to one component system and had a characteristic of non-foaming.

COMPARATIVE EXAMPLE 1

In a metal beaker, 100 g of Hiprene L-167 which had previously been preheated at 80° C. were charged and deaerated for 15 minutes under vacuum and 19.5 g of methylenebisorthochloroaniline(MOCA) which had previously been fused at 120° C. were added. The mixture was stirred without containing bubbles. A mold having a thickness of 3 mm was preheated to 100° C. and the above mixture was immediately poured into the mold. After cured at 100° C. for 24 hours, a cured sheet was released from the mold. Physical properties of the sheet are illustrated in Table 4.

TABLE 4

|  | Example 6 | Example 7 | Example 8 | Example 9 | Comp. Ex. 1 |
|---|---|---|---|---|---|
| Blending (ratio of weight) | | | | | |
| Prepolymer Hiprene L-167 (equivalent) | 693 (1.047) | 583 (0.88) | 430 (0.65) | 405 (0.611) | 100 (0.151) |
| ALD-6, 60% toluene solution (equivalent) | 377 (0.942) | | | | |
| ALD-7, 60% toluene solution (equivalent) | | 376 (0.80) | | | |
| ALD-8, 60% toluene solution (equivalent) | | | 409 (0.591) | | |
| ALD-9, 60% toluene solution (equivalent) | | | | 406 (0.556) | |
| 2-Ethylhexanoic acid | 2 | 4 | 3 | 3 | |
| Methylenebis-o-chloroaniline (MOCA) (equivalent) | | | | | 19.5 (0.146) |
| Curing | 23° C., 50% RH 7 days + 50° C., 50% RH 7 days | | | | 100° C. 24 hours |
| Cur. abil | | | | | |
| Tack-free time (min) | 90 | 110 | 150 | 170 | P. L. 60 min |
| Internal curing time (hours) | 20~30 | 20~30 | 20~30 | 20~30 | — |
| Sto. sta. | | | | | |
| Viscosity after 14 days × 23° C. (PS/25° C.) | 280 | 210 | 195 | 180 | two components mixing type |
| Viscosity after 14 days × 50° C. (PS/25° C.) | 410 | 350 | 305 | 295 | |
| Cured resin | | | | | |
| Modulus, 100% tensile (Kg/cm$^2$) | 191 | 188 | 163 | 152 | 127 |
| Modulus, 200% tensile (Kg/cm$^2$) | 320 | 310 | 285 | 270 | 175 |
| Tensile strength | 390 | 360 | 410 | 350 | 400 |

TABLE 4-continued

| | Example | | | | Comp. Ex. |
| --- | --- | --- | --- | --- | --- |
| | 6 | 7 | 8 | 9 | 1 |
| (Kg/cm²) | | | | | |
| Elongation (%) | 410 | 420 | 420 | 400 | 400 |

Note:
Comp. Ex. Comparative Example
RH Relative humidity
Cur. abil Curing ability
Sto. sta. Storage stability
P.L. Pot-Life

EXAMPLE 10

A mixture of 47 g (0.274 equivalent) of ALD-2 prepared in Example 2, 100 g (0.304 equivalent) of a trimethylolpropane adduct having a NCO content of 11.6 % (Olester® P-45-75S, a product of Mitsui Toatsu Chemicals Inc.) and 18 g of toluene was sealed and stored at 50° C. for a month. After preservation, no change was observed.

Then the mixture was applied on a glass plate to a thickness of 0.5 mm and allowed to stand at 25° C. in an atmosphere having a relative humidity of 50 %. The surface of the mixture was cured after 60 minutes and a coated film having a pencil hardness H was obtained.

EXAMPLE 11

A mixture of 31 g (0.136 equivalent) of ALD-1 prepared in Example 1, 100 g (0.151 equivalent) of a tolylene diisocyanate adduct of polyoxytetramethyleneglycol having a NCO content of 6.35 % (Hiprene® L-167, a product of Nitsui Toatsu Chemicals Inc.) 35 g of dibutyl phthalate and 0.3 g of 2-ethylhexanoic acid was sealed and stored at 50° C. for a month. After preservation, no change was observed.

Then the mixture was applied on a glass plate to a thickness of 0.5 mm and allowed to stand at 25° C. in an atmosphere having a relative humidity of 50 %. The surface of the mixture was cured after 80 minutes.

The mechanical strengths of cured film were measured in accordance with JIS-K 6301. After application, the film was allowed to stand at 23° C. for 7 days in a relative humidity of 50 % and successively allowed to stand at 50° C. for 7 days. Then 100 % and 200 % tensile modulus, tensile strength and elongation at break were measured.

The film had a 100 % modulus of 115 kg/cm², 200 % modulus of 210 kg/cm², tensile strength of 350 kg/cm² and an elongation of 280 %. No foaming was found at all in the film. The film retained performance as an anticorrosive paint. (Examples and Comparative Examples of Moisture Curable Caulking Materials)

EXAMPLE 12

Following materials were used in the examples.
Polyaldimine . . . ALD-5 prepared in Example 5 indicated in Table 3.
Prepolymer . . . . . a prepolymer prepared by reacting 598 g of tolylene-2,4-diisocyanate at 100° C. for 10 hours with 2600 g of polyoxypropylene diol(MW. 2000) and 1802 g of polyoxypropylene triol(MW. 3000). Terminal NCO content was 1.9 %. Viscosity was 41,000 cps/25° C.
Thixotropic . . . . Super Fine Hydrophobic Silica #R-972, a product agent of Japan Aerosil Co. Ltd.

Storage stability was evaluated by storing the moisture curable polyurethane caulking composition for a prescribed period under sealed conditions and then measuring penetration at 2 seconds and 5 seconds (10⁻¹ mm) in accordance with JIS-K2808(1961).

To a 3 l planetary mixer, 380 g of dioctyl phthalate, 400 g of calcium carbonate, 99 g of titanium oxide, 75 g of anhydrous aluminum sulfate, and 8 g of a weathering stabilizer (Irganox 1010) were charged and mixed for 15 minutes at room temperature. Successively the mixture was kneaded at 100° C. for an hour with dehydration under vacuum.

Then 445 g (0.2018 equivalent) of the prepolymer, and 124 g (0.1816 equivalent) of a 60 % xylene solution of ALD-5 prepared in Example 5 were char9ed and kneaded for 15 minutes at room temperature.

Further, 130 g of the thixotropic agent R-972 and 175 g of xylene were charged and kneaded for 10 minutes under vacuum at room temperature to obtain a moisture curable polyurethane caulking material of this invention.

As illustrated in Table 5, tack free time of the caulking material thus obtained was shorter than that of high hardness sealing materials for vehicle use or usual caulking materials which are generally available in the market. Hence curing ability was improved.

As illustrated in Table 6, the caulking material thus obtained was excellent in hardness and strengths, had good workability after storage at 50° C. for 14 days under sealed conditions and caused no foaming at all on the cured material after application in site.

Additionally, no foaming was observed at all even at high curing temperatures such as 80° C.

EXAMPLE 13

To a 3 l planetary mixer, 380 g of dioctyl phthalate, 400 g of calcium carbonate, 99 g of titanium oxide, 75 g of kaolin clay and 8 g of a weathering stabilizer (Irganox 1010) were charged and mixed for 15 minutes at room temperature. Successively the mixture was kneaded at 100° C. for an hour with dehydration under vacuum.

Then 445 g (0.2018 equivalent) of the prepolymer, and 131 g (0.1816 equivalent) of a 60 % xylene solution of ALD-6 prepared in Example 6 were charged and kneaded for 15 minutes at same temperature.

Further, 130 g of the thixotropic agent R-972 and 180 g of xylene were charged and kneaded for 10 minutes under vacuum at room temperature to obtain a moisture curable polyurethane caulking material of this invention.

As illustrated in Table 5, tack free time of the caulking material thus obtained was shorter than that of high hardness sealing materials for vehicle use or usual caulking materials which are generally available in the market. Hence curing ability was improved.

As illustrated in Table 6, the caulking material thus obtained was excellent in hardness and strengths, had good workability after storage at 50° C. for 14 days under sealed conditions and caused no foaming at all on the cured material after application in site.

Additionally, no foaming was observed at all even at high curing temperatures such as 80° C.

COMPARATIVE EXAMPLE 2

The same procedures as conducted in Example 12 were carried out except that ALD 5 was omitted.

Results are illustrated in Table 5 and Table 6. The composition exhibited very slow curing rate and also caused foaming after application. Hence, cured composition had inferior mechanical properties.

TABLE 5

|  | Example 12 | Example 13 | Comp. Ex. 2 |
|---|---|---|---|
| Calcium carbonate | 400 | 400 | 475 |
| Titanium oxide | 99 | 99 | 99 |
| Anhydrous aluminium Kaolin clay | 75 | 75 |  |
| Dioctyl phthalate | 380 | 380 | 380 |
| Prepolymer (equivalent) | 445 (0.2018) | 445 (0.2018) | 445 |
| Aerosil R972 | 130 | 130 | 130 |
| Xylene | 175 | 180 | 175 |
| Irganox 1010 | 8 | 8 | 8 |
| ALD-5 60% Xylene solution (equivalent) | 124 (0.1816) |  |  |
| ALD-6 60% Xylene solution (equivalent) |  | 131 (0.1816) |  |
| Tack-free time (min) | 25 | 30 | upper 300 |
| Internal curing time (hour) | 10~20 | 10~20 | upper 20 |

TABLE 6

|  | Example 12 | Example 13 | Comp. Ex. 2 |
|---|---|---|---|
| Storage stability |  |  |  |
| Penetration ($10^{-1}$ mm) |  |  |  |
| Immediately after production | 2 sec 420< | 420< | 420< |
|  | 5 sec 420< | 420< | 420< |
| After 50° C. × 14 days | 2 sec 250 | 230 | 290 |
|  | 5 sec 330 | 300 | 360 |
| Physical property of cured resin |  |  |  |
| Modulus (Kg/cm$^2$) |  |  |  |
| 100% tensile | 10.5 | 11.5 | 1.5 |
| 200% tensile | 20.2 | 22.4 | 3.5 |
| Tensile strength (Kg/cm$^2$) | 31 | 32 | 10 |
| Elongation (%) | 310 | 330 | 850 |
| Foaming | non | non | found |

(Examples and Comparative Examples of Moisture Curable Water Proof Materials)

EXAMPLE 14

Following materials were used in the examples.
Polyaldimine ... ALD-1 in Table 3
Prepolymer ..... a prepolymer prepared by reacting 598 g of tolylene-2,4-diisocyanate at 100° C. for 10 hours with 2600 g of polyoxypropylenediol(MW. 2000) and 1802 g of polyoxypropylene triol(MW. 3000). Terminal NCO content was 1.9 %. Viscosity was 41,000 cps/25° C.
Thixotropic agent ... Super Fine Hydrophobic Silica #R-972, a product of Japan Aerosil Co. Ltd.

Physical properties were tested by the same method as carried out in Example 6.

To a 3 l planetary mixer, 220 g of dioctyl phthalate, 610 g of calcium carbonate, 60 g of titanium oxide, 5 g of 2-ethylhexanoic acid and 8 g of a weathering stabilizer (Irganox 1010) were charged and mixed for 15 minutes at room temperature. Successively the mixture was kneaded at 100° C. for an hour with dehydration under vacuum.

Then 649 g (0.293 equivalent) of the prepolymer, and 100 g (0.246 equivalent) of a 60 % toluene solution of ALD-1 prepared in Example 1 were charged and kneaded for 15 minutes at room temperature.

Further, 15 g of the thixotropic agent R-972 and 160 g of toluene were charged and kneaded for 10 minutes under vacuum at room temperature to obtain a moisture curable polyurethane water proof material of this invention.

As illustrated in Table 7, tack free time of the water proof material thus obtained was shorter than that of water proof materials which are generally available in the market. Hence curing ability was improved.

As illustrated in Table 7, the water proof material thus obtained was excellent in hardness and strengths, had good workability after storage at 50° C. for 14 days under sealed conditions and caused no foaming at all on the cured material after application in site.

EXAMPLE 15

To a 3 l planetary mixer, 220 g of dioctyl phthalate, 610 g of calcium carbonate, 60 g of titanium oxide, and 12 g of a weathering stabilizer (Irganox ®1010) were charged and mixed for 15 minutes at room temperature. Successively the mixture was kneaded at 100° C. for an hour with dehydration under vacuum.

Then 649 g (0.293 equivalent) of the prepolymer, and 106 g (0.260 equivalent) of a 60 % toluene solution of ALD-6 were charged and kneaded for 15 minutes at room temperature.

Further, 15 g of the thixotropic agent R-972 and 160 g of toluene were charged and kneaded for 10 minutes under vacuum at room temperature to obtain a moisture curable polyurethane composition of this invention.

As illustrated in Table 7, tack free time of the composition thus obtained was short and hence curing ability was improved.

As illustrated in Table 6, the water proof material thus obtained was excellent in hardness and strengths, had good workability after storage at 50° C. for 14 days under sealed conditions and caused no foaming at all on the cured material after application in site. The composition also retained performance of one component type flooring material.

COMPARATIVE EXAMPLE 3

The same procedures as conducted in Example 14 were carried out except that ALD-1 was omitted.

Results are illustrated in Table 7. The composition exhibited very slow curing rate and also caused foaming after application. Hence, cured composition had inferior mechanical properties.

COMPARATIVE EXAMPLE 4

The same procedures as conducted in Example 1 were carried out except that polymeric methylenedianiline (MDA-150, a product of Mitsui Toatsu Chemicals, Inc., amine value =299) was used in place of AAP-1. The polyaldimine derivative (ALD-10) thus obtained is dissolved in toluene in a concentration of 60% by weight.

The same procedures as conducted in Example 14 were carried out except that 83 g of a 60 % toluene solution of ALD-10 were used in place of ALD-1.

The moisture curable polyurethane water proof material thus obtained had very inferior properties. That is, curing ability, viscosity and 100 % tensile modulus exhibited large variation after storage, as illustrated in Table 7. Consequently, storage stability was very poor.

TABLE 7

|  | Example | | Comp. Ex. | |
|---|---|---|---|---|
|  | 14 | 15 | 3 | 4 |
| Blending (ratio of weight) | | | | |
| Calcium carbonate | 610 | 610 | 610 | 610 |
| Titanium oxide | 60 | 60 | 60 | 60 |
| 2-Ethylhexanoic acid | 5 | 5 |  | 10 |
| Dioctylphthalate | 220 | 220 | 320 | 220 |
| Prepolymer | 649 (0.293)* | 649 (0.293)* | 716 | 649 (0.293)* |
| Aerosil R972 | 15 | 15 | 20 | 15 |
| Toluene | 160 | 160 | 80 | 160 |
| Irganox 1010 | 8 | 12 | 12 | 12 |
| ALD-1, 60% Toluene solution | 100 (0.264)* |  |  |  |
| ALD-6, 60% Toluene solution |  | 106 (0.266)* |  |  |
| ALD-10, 60% Toluene solution |  |  |  | 83 (0.265)* |
| Storage stability | | | | |
| *23° C. After 14 days* | | | | |
| Tack-free time (min) | 100 | 80 | >300 | 120 |
| Viscosity (PS/25° C.) | 29.0 | 28.0 | 35.0 | 26.0 |
| Modulus, 100% tens. (kg/cm²) | 12.5 | 8.6 | 4.2 | 17.4 |
| Tensile strength (kg/cm²) | 35.1 | 43.2 | 29.8 | 32.4 |
| Elongation (%) | 410 | 780 | 1160 | 280 |
| Foaming | none | none | found | none |
| *50° C. After 14 days* | | | | |
| Tack-free time (min) | 100 | 80 | >300 | 200 |
| Viscosity (PS/25° C.) | 42.6 | 35.0 | 45.8 | 97.9 |
| Modulus, 100% tens. (kg/cm²) | 10.2 | 7.0 | 3.9 | 11.3 |
| Tensile strength (kg/cm²) | 28.6 | 32.5 | 27.2 | 24.4 |
| Elongation (%) | 410 | 780 | 1200 | 290 |
| Foaming | none | none | found | none |

Note:
*Equivalent
tens. tensile

What is claimed is:

1. A poly(phenylenebisalkylene)poly(phenylaldimine) represented by the formula (I):

wherein $R^1$, $R^2$ and $R^3$ are a halogen atom, hydrogen atom, alkoxy group having 4 or less carbon atoms or an alkyl group having 5 or less carbon atoms, and may be the same or different; $R^4$ is a hydrogen atom or a methyl group; Y is $-N=CH-C(R^5)_3$ or $-N=CH-C(CH_3-)_2-CH_2-O-CO-R^6$ wherein $R^5$ is an alkyl group having 4 or less carbon atoms, $R^6$ is an alkyl group, anilino group, benzylamino group or an alkylamino group having 16 or less carbon atoms; and l is an integer of 1 or 2, m is an integer of 1 to 3, and n is an integer of 0 to 300.

2. The poly(phenylenebisalkylene)poly(phenylaldimine) of claim 1 wherein $R^1$, $R^2$ and $R^3$ are a hydrogen atom, chlorine atom, methoxy group, ethoxy group, methyl group, ethyl group or isopropyl group and may be the same or different; $R^4$ is a hydrogen atom or a methyl group; $R^5$ is a methyl group or a ethyl group; and l is an integer of 1 to 2, m is an integer of 1 to 2, and n is an integer of 0 to 10.

3. The poly(phenylenebisalkylene)poly(phenylaldimine) of claim 1 wherein $R^6$ is a methyl group, ethyl group, propyl group, 2-ethylpentyl group, butylamino group or a anilino group.

4. The poly(phenylenebisalkylene)poly(phenylaldimine) of claim 1 wherein $R^1$, $R^2$ and $R^3$ are a hydrogen atom, chlorine atom or a methyl group; $R^4$ is a hydrogen atom; $R^5$ s a methyl group; and l is an integer of 1 to 2, m is an integer of 1 and n is an integer of a to 4.

5. The poly(phenylenebisalkylene)poly(phenylaldimine) of claim 1 wherein $R^6$ is a methyl group, 2-ethylpentyl group, butylamino group or a anilino group.

6. The poly(phenylenebisalkylene)poly(phenylaldimine) of claim 1 wherein $R^1$, $R^2$ and $R^3$ are a hydrogen atom, $R^4$ is a methyl group, and l is an integer of 1, and n is an integer of 0 to 2.

7. The poly(phenylenebisalkylene)poly(phenylaldimine) of claim 1 wherein $R^1$, $R^2$ and $R^3$ is a hydrogen atom, $R^4$ is a methyl group, l is an integer of 1, and n is zero.

8. A process for the preparation of a poly(phenylenebisalkylene) poly(phenylaldimine) represented by the formula (I):

wherein $R^1$, $R^2$, $R^3$, $R^4$, Y, l, m and n are the same as in the formula (I) of claim 1, which comprises reacting a poly(phenylenebisalkylene)poly(phenylamine) represented by the formula (II):

wherein $R^1$, $R^2$, $R^3$, $R^4$, Y, l, m and n are the same as in the formula (I) of claim 1, with an aldehyde represented by the formula (III) or (IV):

$$O=CH-C(R^5)_3 \quad\quad (III)$$

$$O=CH-C(CH_3)_2-CH_2-O-CO-R^6 \quad\quad (IV)$$

wherein $R^5$ and $R^6$ are the same as in the formula (I) of claim 1.

9. The process of claim 8 wherein $R^1$, $R^2$ and $R^3$ are a hydrogen atom, chlorine atom, methoxy group, ethoxy group, methyl group, ethyl group or an isopropyl group, and may be the same or different; $R^4$ is a hydrogen atom or a methyl group; $R^5$ is a methyl group or an ethyl group; and l is an integer of 1 to 2, m is an integer of 1 to 2, and n is an integer of 0 to 10.

10. The process of claim 8 wherein $R^6$ is a methyl group, ethyl group, propyl group, 2-ethylpentyl group, butylamino group or an anilino group.

11. The process of claim 8 wherein $R^1$, $R^2$ and $R^3$ are a hydrogen atom, chlorine atom or a methyl group, and may be the same or different; $R^4$ is a hydrogen atom; $R^5$ is a methyl group; and l is an integer of 1 to 2, m is an integer of 1, and n is an integer of 0 to 4.

12. The process of claim 8 wherein $R^6$ is a methyl group, 2-ethylpentyl group, butylamino group or an anilino group.

13. The process of claim 8 wherein $R^1$, $R^2$ and $R^3$ are a hydrogen atom, $R^4$ is a methyl group, l is an integer of 1, and n is an integer of 0 to 2.

14. The process of claim 8 wherein $R^1$, $R^2$ and $R^3$ are a hydrogen atom, $R^4$ is a methyl group, l is an integer of 1 and n is zero.

15. The process of claim 8 wherein 1 mole of the poly (phenylenebisalkylene)poly(phenylamine) is reacted with 1 to 2 moles of the aldehyde at a temperature of 80° C. to 120° C. for 5 to 10 hours.

16. A moisture curable polyurethane composition comprising the poly(phenylenebisalkylene)poly(phenylaldimine) of claim 1 and an organic polyisocyanate and/or a polyurethane prepolymer having terminal isocyanato groups.

17. A moisture curable polyurethane caulking, sealing, wall covering material or paint comprising the moisture curable polyurethane composition of claim 16 and a thixotropic agent.

18. A moisture curable polyurethane water-proof or flooring material comprising the moisture curable polyurethane composition of claim 16 and a filler.

19. The moisture curable polyurethane composition of claim 16 wherein the organic polyisocyanate is an aromatic, aliphatic or alicylic polyisocyanate, urethane modified polyisocyanate, isocyanurate modified polyisocyanate, carbodiimide modified polyisocyanate or a biuret modified polyisocyanate.

20. The moisture curable polyurethane composition of claim 16 wherein the polyurethane prepolymer having terminal isocyanato groups is obtained by reacting one or more of polyisocyanate selected from the group consisting of an aromatic, aliphatic or alicyclic polyisocyanate, urethane modified polyisocyanate, isocyanurate modified polyisocyanate, carbodiimide modified polyisocyanate and a biuret modified polyisocyanate with one or more of active hydrogen containing compounds selected from the group consisting of a polyetherpolyol, polyetherpolyamine, polytetramethylenetherpolyol, polyesterpolyol, higher fatty acid ester, polymerpolyol and a mercaptopolyether.

21. The moisture curable polyurethane composition of claim 16 wherein an amino group regenerated by the hydrolysis of the poly(phenylenebisalkylene)poly(phenylaldimine) is in an amount from 0.7 to 1.5 moles per mole of an isocyanate group of the organic polyisocyanate and/or the polyurethane prepolymer having terminal isocyanato groups.

22. The moisture curable polyurethane caulking, sealing, wall covering material or paint of claim 17 wherein the thixotropic agent is one or more of substance selected from the group consisting of colloidal silica, fatty acid amide wax, aluminum stearate, surface treated bentonite, polyethylene short fiber and phenol resin fiber.

23. The moisture curable polyurethane caulking, sealing, wall covering material or paint of claim 22 wherein the thixotropic agent is in an amount of 0.2 to 15 % by weight per weight of the moisture curable polyurethane composition.

24. The moisture curable polyurethane water-proof or flooring material of claim 18 wherein the filler is one or more of substance selected from the group consisting of calcium carbonate, talc, kaolin, aluminum sulfate, zeolite, diatomaceous earth, polyvinyl chloride paste resin, glass balloon and polyvinylidene chloride balloon.

25. The moisture curable polyurethane water-proof or flooring material of claim 24 wherein the filler is in an amount of 20 to 60 % by weight per weight of the moisture curable polyurethane composition.

* * * * *